United States Patent
Taguchi et al.

(10) Patent No.: US 7,681,684 B2
(45) Date of Patent: Mar. 23, 2010

(54) ON-VEHICLE COMPONENT FIXATION-RELEASE APPARATUS

(75) Inventors: Katsuaki Taguchi, Utsunomiya (JP);
Yuta Urushiyama, Utsunomiya (JP);
Suguru Yoshida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 684 days.

(21) Appl. No.: 10/591,154

(22) PCT Filed: Mar. 3, 2005

(86) PCT No.: PCT/JP2005/003582

§ 371 (c)(1),
(2), (4) Date: Aug. 30, 2006

(87) PCT Pub. No.: WO2005/085011

PCT Pub. Date: Sep. 15, 2005

(65) Prior Publication Data

US 2007/0158127 A1 Jul. 12, 2007

(30) Foreign Application Priority Data

Mar. 5, 2004 (JP) ............................. 2004-063033

(51) Int. Cl.
*B60K 28/00* (2006.01)
(52) U.S. Cl. .................................. 180/271
(58) Field of Classification Search ............. 180/268, 180/271, 274, 282
See application file for complete search history.

(56) References Cited

U.S. PATENT DOCUMENTS

| | | | | |
|---|---|---|---|---|
| 3,853,199 A | * | 12/1974 | Hirashima et al. | 180/274 |
| 4,249,632 A | * | 2/1981 | Lucchini et al. | 180/274 |
| 5,727,288 A | * | 3/1998 | Byon | 16/254 |
| 6,329,910 B1 | * | 12/2001 | Farrington | 340/436 |
| 6,412,584 B1 | * | 7/2002 | Faigle et al. | 180/282 |
| 6,516,278 B1 | * | 2/2003 | Ishizaki et al. | 702/33 |
| 2003/0051936 A1 | * | 3/2003 | Ishizaki et al. | 180/274 |
| 2004/0195815 A1 | * | 10/2004 | Browne et al. | 280/753 |

(Continued)

FOREIGN PATENT DOCUMENTS

JP     2001-191878     7/1978

(Continued)

*Primary Examiner*—Paul N Dickson
*Assistant Examiner*—Robert A Coker
(74) *Attorney, Agent, or Firm*—Carrier, Blackman & Associates, P.C.; William D. Blackman; Joseph P. Carrier (57) ABSTRACT

To readily remove on-vehicle components from a vehicle body, suitably reflecting the state of the vehicle or occupant in addition to the will of the operator.

The safety confirmation device 11 determines whether or not to permit actuation of the separation actuator 13, that is, whether to set the switch 12 to the ON state to allow an electrical connection from the power supply 14 to the separation actuator 13, based on the signals input from the external input receiving portion 21, the occupant protection device 22, the status quantity sensor 23, and the input portion 24, and outputs a gate signal corresponding to this determination result to the switch 12. Electrification of the separation actuator 13 from the power supply 14 via the switch 12 releases the fixation of an on-vehicle component by disassembling the fixation member that fixes the on-vehicle component to the vehicle body.

5 Claims, 7 Drawing Sheets

U.S. PATENT DOCUMENTS

2007/0158127 A1   7/2007   Taguchi et al.

FOREIGN PATENT DOCUMENTS

| JP | 2-34452 | 2/1990 |
| JP | 07-047866 | 2/1995 |
| JP | 08-270286 | 10/1996 |
| JP | H08-268059 | 10/1996 |
| JP | 11-099895 | 4/1998 |
| JP | 11-099895 | 4/1999 |
| JP | 2000-215372 | 8/2000 |
| JP | 2001-191878 | 7/2001 |
| JP | 2001-276672 | 10/2001 |
| JP | 2001-328531 | 11/2001 |
| JP | 2002-279591 | 9/2002 |
| JP | 2002-351259 | 12/2002 |
| JP | 2003-145564 | 5/2003 |
| JP | 2004-048426 | 2/2004 |
| WO | WO-99/39156 | 8/1999 |
| WO | WO 2005/085011 A1 | 9/2005 |

* cited by examiner

ON-VEHICLE COMPONENT FIXATION-RELEASE APPARATUS

TECHNICAL FIELD

The present invention relates to an on-vehicle component fixation-release apparatus.

Priority is claimed on Japanese Patent Application No. 2004-063033, filed Mar. 5, 2004, the content of which is incorporated herein by reference.

BACKGROUND ART

There is conventionally known a door separation apparatus in which a mounting member for mounting a door to a vehicle body can be broken apart to enable separation of the door from the vehicle body during deformation of the vehicle body, thereby preventing occupants from being trapped inside the vehicle cabin (for example, refer to Patent Document 1).

In this door separation apparatus, an explosive is packed in a member constituting a hinge that attaches the door to the vehicle body, so that when a detonator switch that sets off the explosive is activated by an operator, the attachment of the door is released by the breaking apart of the hinge, whereby the door can be removed from the vehicle body.

Patent Document 1: Japanese Unexamined Patent Application, First Publication No. H08-268059.

DISCLOSURE OF THE INVENTION

Problems to be Solved by the Invention

In the aforementioned door separation apparatus of the prior art, since the explosive is filled in the door fixing member, there may be difficulty in removing the door in the circumstances and timing intended by the operator.

The present invention was made in view of the aforementioned circumstances and has as its object to provide an on-vehicle component fixation-release apparatus that can readily remove an on-vehicle component from a vehicle body to suitably reflect the state of the vehicle and its occupants as well as the intention of the operator.

Means for Solving the Problem

In order to solve the aforementioned problems and achieve the object, the present invention is an on-vehicle component fixation-release apparatus that releases the fixation of on-vehicle components attached to a vehicle body by a fastening member, which includes a dismantling means that enables dismantling of the fastening member or a fastening portion at which the fastening member is mounted, and a determination means that determines whether or not the dismantling means dismantles in accordance with an input signal that is input from outside the vehicle.

The on-vehicle component fixation-release apparatus thus constituted is provided with a determination means that determines whether or not the dismantling means dismantles a fastening member or a fastening portion. Thereby, even when an input signal that instructs the dismantling of a fastening member or a fastening portion is input from outside the vehicle, dismantling of a fastening member or a fastening portion can be prevented in a condition, state or timing in which releasing the fixation of the on-vehicle component would be unsuitable.

That is, the fixation of an on-vehicle component can be suitably released by determining with the determination means the feasibility of dismantling depending on, for example, the state of the vehicle or the state of the occupants in the vehicle cabin.

Also, the on-vehicle component fixation-release apparatus according to the present invention is characterized by further includes an electrical storage means that supplies electrical power that is required for executing dismantling by the dismantling means.

The on-vehicle component fixation-release apparatus thus constituted is provided with a dedicated-purpose electrical storage means for supplying electrical power that is required for dismantling a fastening member or a fastening portion, independently of a high-voltage battery that supplies electrical power to the high-voltage electrical system of the vehicle and the 12V battery that drives auxiliary components. Thereby, dismantling of a fastening member or a fastening portion can be executed even when there is difficulty in supplying power from the high-voltage battery or the 12V battery.

Moreover, the on-vehicle component fixation-release apparatus according to the present invention is characterized by the fastening member or the fastening portion being formed with at least two detachably fixed members including a shape memory member that is formed with a shape memory alloy and another member that is formed with a material other than the shape memory alloy, and further includes a heating means that, in accordance with the determination result of the determination means, heats the shape memory member until the temperature of the shape memory member is equal to or greater than the transformation point of the shape memory member.

With the on-vehicle component fixation-release apparatus thus constituted, the fixation of an on-vehicle component can be readily released by performing a setting so that the fixation state of the shape memory member and the other member, which are detachably fixed, is released by deformation of the shape memory member.

Moreover, the on-vehicle component fixation-release apparatus according to the present invention is characterized by the fastening member or the fastening portion formed by at least two detachably fixed members that are formed with materials having mutually different expansion coefficients; with a convex insertion portion formed on the member with a relatively small expansion coefficient, and a concave or hole-shaped engagement portion that has a predetermined interference with respect to the insertion portion formed on the member with a relatively large expansion coefficient; and the insertion portion fixed to the engagement portion in a state of being inserted therein and interference fitted, and further includes a heating means that, in accordance with the determination result of the determination means, heats the member until the fixation state between the insertion portion and the engagement portion is released.

With the on-vehicle component fixation-release apparatus thus constituted, the fixation of an on-vehicle component can be readily released by performing a setting so that the fixation state of the two members, which are detachably fixed, is released by deformation of the member with the relatively large expansion coefficient.

Moreover, the on-vehicle component fixation-release apparatus according to the present invention is characterized by the fastening member or the fastening portion including a fragile portion, and the dismantling means functions as a separation actuator that separates the fastening member or the fastening portion at the fragile portion in accordance with the determination result of the determination means.

With the on-vehicle component fixation-release apparatus thus constituted, by providing a separation actuator that can generate stress to such an extent that the fragile portion of the fastening portion fractures in accordance with the input signal and the determination result of the determination means, the fixation of the on-vehicle component can be readily released.

Moreover, the on-vehicle component fixation-release apparatus according to the present invention is characterized by the separation actuator including a separation member that is formed with a shape memory alloy or a material with a larger expansion coefficient than the fragile portion and capable of generating stress that fractures the fragile portion by heat deformation, and a heating means that performs heat deformation by heating the separation member until the fragile portion fractures.

With the on-vehicle component fixation-release apparatus thus constituted, the fixation of the on-vehicle component can be readily released by the deformation of the shape memory alloy or a material with a larger expansion coefficient than the fragile portion.

The on-vehicle component fixation-release apparatus of the present invention can release the fixation of an on-vehicle component in a suitable state and timing.

Also, difficulties in executing dismantling of the fastening member or the fastening portion can be inhibited.

Moreover, the fixation of an on-vehicle component can be readily released by deformation of a shape memory alloy.

In addition, the fixation of an on-vehicle component can be readily released by deformation of a member with a relatively large expansion coefficient.

Furthermore, the fixation of an on-vehicle component can be readily released by providing a dismantling means that can generate stress to such an extent that the fragile portion of the fastening portion fractures in accordance with the input signal and the determination result of the determination means.

DESCRIPTION OF THE REFERENCE SYMBOLS

10: on-vehicle component fixation-release apparatus
11: safety confirmation device (determination means)
13: separation actuator (separation means)
14: power supply (electrical storage means)
30, 40: power supply (electrical storage means)
31b: fragile portion
32a: inner periphery (shape memory member, separation member)
32b: heater
41: head (shape memory member, separation member)
41a: through hole
42: shank (another member) 42
42a: male portion (insertion portion) 42a
52a, 52b: electrode (heating means)
62: heater (heating means)
72: coil (heating means)

BEST MODE FOR CARRYING OUT THE INVENTION

The on-vehicle component fixation-release apparatus according to one embodiment of the present invention shall be described below with reference to the accompanying drawings.

Figure 1:
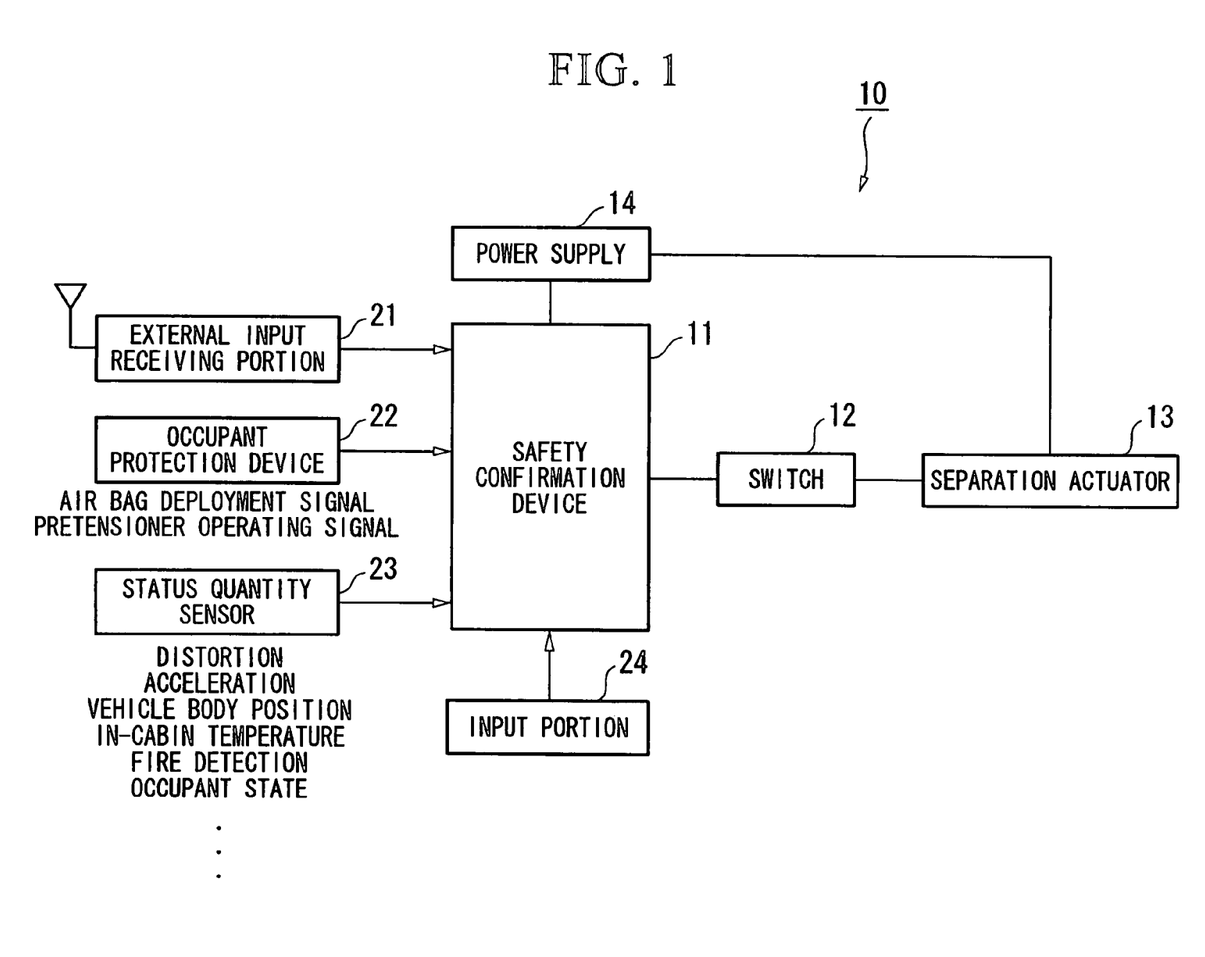
FIG. 1 is a block diagram showing the on-vehicle component fixation-release apparatus according to one embodiment of the present invention.

An on-vehicle component fixation-release apparatus 10 according to the present embodiment includes a safety confirmation device (determination means) 11 constituted by an electronic circuit that includes a CPU or the like for determining the feasibility of fixation release of an on-vehicle component; a switch 12; a separation actuator (separation means) 13; a power supply (electrical storage means) 14 such as, for example, a capacitor; an external input receiving portion 21; an occupant protection device 22; a status quantity sensor 23; and an input portion 24.

The safety confirmation device 11 determines whether or not to permit actuation of the separation actuator 13, that is, whether to set the switch 12 to the ON state to allow an electrical connection from the power supply 14 to the separation actuator 13, based on the signals input from the external input receiving portion 21, the occupant protection device 22, the status quantity sensor 23, and the input portion 24, and outputs a gate signal corresponding to this determination result to the switch 12.

Here, the external input receiving portion 21 receives a command signal transmitted from a communication terminal or a base station and the like outside the vehicle, that is a signal that instructs actuation of the separation actuator 13, and outputs it to the safety confirmation device 11.

Also, the occupant protection device 22 is, for example, a seat belt device or an air bag device. The occupant protection device 22 outputs to the safety confirmation device 11 a pretensioner operating signal that applies a tightening force that an occupant in the vehicle can tactilely perceive by generating a predetermined tension in the seat belt, or an air bag deployment signal that shows deployment of the air bag.

Also, the status quantity sensor 23 is constituted by being provided with a distortion sensor, an acceleration sensor, a gyro sensor, a tilt sensor, an in-cabin temperature sensor, a fire detection sensor, and an occupant state sensor, etc., with the detection signal output from each of the sensors being output to the safety confirmation device 11.

The distortion sensor detects distortion in the vehicle body, the acceleration sensor detects acceleration and deceleration of the vehicle body, the gyro sensor detects a heading of the vehicle in a horizontal plane and a tilt angle with respect to a vertical direction (for example, a yaw angle, which is a rotational angle around a vertical axis that passes through the vehicle's center of gravity). Moreover, the in-cabin temperature sensor detects the temperature in the cabin, and the fire detection sensor detects the presence of a fire in the engine room. Also, the occupant state sensor detects the posture and a vital reaction of the occupant.

Also, the input portion 24 outputs a signal of an operation input made by a manual operation by an operator to the safety confirmation device 11.

The switch 12 includes a semiconductor switch or the like, and switches the electrification of the separation actuator 13 ON/OFF in accordance with the gate signal output from the safety confirmation device 11.

Figure 2:
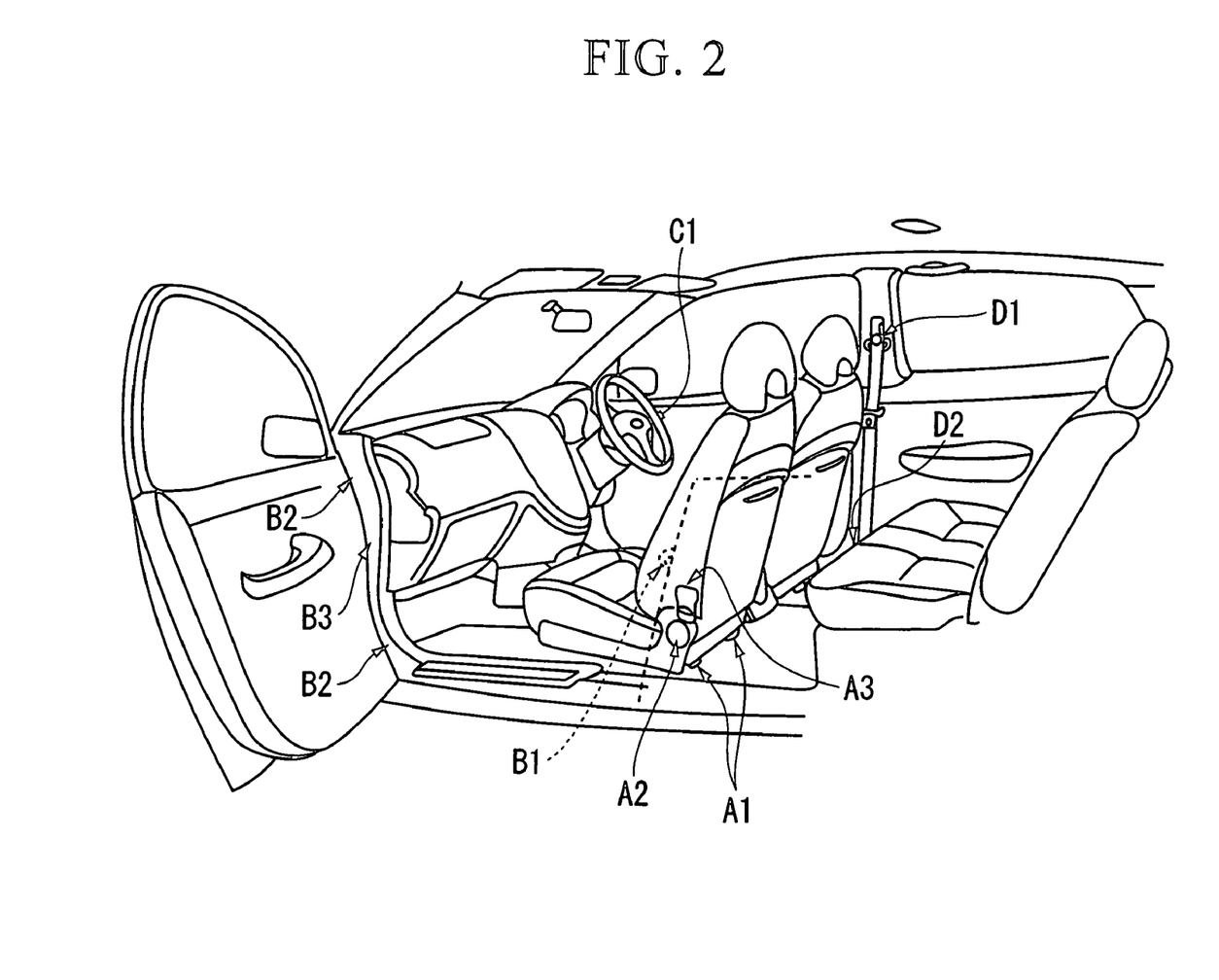
FIG. 2 is a drawing showing one example of an on-vehicle component fitted with the separation actuator shown in FIG. 1.

The separation actuator 13 is provided in a fastening member 30 that fastens various types of on-vehicle components to the vehicle body. The fastening member 30, as shown for example in FIG. 2, is used for such bolts as a bolt A1 that fixes the seat to the vehicle body floor, a bolt A2 that fixes the seat back to the seat cushion frame, a bolt A3 that fixes the inner buckle of the seat belt to the seat cushion frame, a bolt B1 that fixes the door striker to the side panel, a bolt B2 that fixes the door hinge to the door panel, a bolt B3 that fixes the door checker to the side panel and the door panel, a bolt C1 that fixes the steering wheel to the steering column shaft, a bolt D1 that fixes the seat belt shoulder anchor to the side panel, and a bolt D2 that fixes the seat belt outer anchor to the side panel. In short, the fastening member 30 is a member that fixes to the vehicle body the on-vehicle component that may impede movement of an occupant from within the cabin to outside the vehicle.

Figure 3:
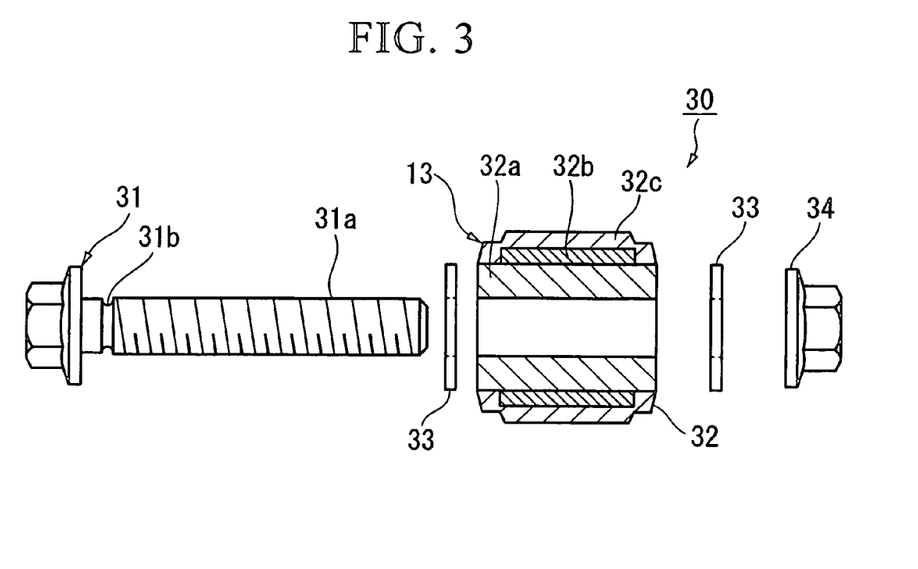
FIG. 3 is a sectional view of the separation actuator shown in FIG. 1 and a side view of the bolt, washer, and nut provided with the separation actuator.
Figure 4:
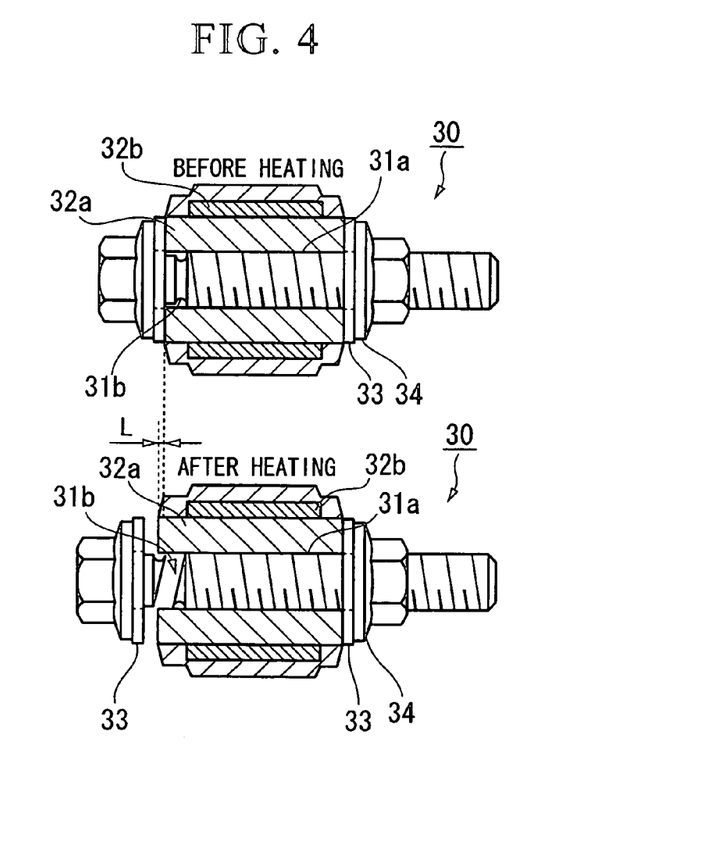
FIG. 4 is a drawing showing the state of the separation actuator shown in FIG. 3 mounted on the bolt.

As shown for example in FIG. 3 and FIG. 4, the fastening member 30 includes a bolt 31, the separation actuator 13, a washer 33, and a nut 34.

The separation actuator 13 includes a cylindrical inner periphery (shape memory member, separation member) 32a that is formed in a substantially cylindrical shape for insertion of a shank 31a of the bolt 31 and has an inner circumferential surface with a diameter that is greater than the outer diameter of the shank 31a of the bolt 31 and smaller than the outer diameter of the head of the bolt 31; a cylindrical heater (heating means) 32b that is fit on the outer circumferential surface of the inner periphery 32a; and a cover 32c that covers the outer circumferential surface of the heater 32b.

The inner periphery 32a of the separation actuator 13 is formed by a shape memory member, for example, a shape memory alloy. Heating by means of the heater 32b, which is energized from the power supply 14, causes the temperature of the inner periphery 32a to rise to a transformation point of the shape memory alloy or more. Thereby, the length thereof in the axial direction extends by a predetermined length L.

Also, a fragile portion 31b having a suitably reduced diameter is formed at a suitable position in the axial portion 31a of the bolt 31, for example, at a position near the head.

The members constituting the fastening member 30, other than the inner periphery 32a, are formed by a material other than the shape memory alloy.

As shown for example in FIG. 4, the separation actuator 13 with the shank 31a of the bolt 31 inserted therein is sandwiched on both sides in the axial direction by washers 33 and 33. Moreover, when the inner periphery 32a of the separation actuator 13 is heated by the heater 32b in the state of being fixedly fastened from both sides in the axial direction by the head of the bolt 31 and the nut 34, at the point in time when the temperature of the inner periphery 32a rises to the transformation point of the shape memory alloy or more, the length in the axial direction extends by the predetermined length L. Thereby, an axial direction stress acts on the shank 31a of the bolt 31 from the deformation of the inner periphery 32a. When the fragile portion 31b fractures as a result of this stress, the head of the bolt 31 and the shank 31a on which the nut 34 is attached separate. Thereby, even when the various type of on-vehicle component is fixed to the vehicle body by the bolt 31 and the nut 34, passing current to the heater 32b of the separation actuator 13 dismantles the bolt 31, so that the on-vehicle component can be removed from the vehicle body.

The fragile portion 31b of the bolt 31 is formed so as not to fracture during the desired fastening state, as is formed so as to fracture when stress acts so that it extends by the predetermined length L in the axial direction.

The power supply 14 is a storage device capable of storing electrical energy such as a capacitor formed by an electrical double-layer capacitor, an electrolytic capacitor, or any type of battery such as a Ni-MH battery, a lead-acid battery, or a lithium ion storage battery. The power supply 14 supplies power to the safety confirmation device 11 and the separation actuator 13 independently of a high-voltage battery that supplies electrical power to the high-voltage electrical devices of the vehicle and the 12V battery that drives the various auxiliary components. The power supply 14 can be charged by the high-voltage battery or 12V battery of the vehicle, as well as a generator device capable of generating electricity, such as an on-vehicle motor or fuel-cell and the like.

The on-vehicle component fixation-release apparatus according to the present embodiment has the aforementioned constitution. Next, the operation of this on-vehicle component fixation-release apparatus shall be explained.

Figure 5:
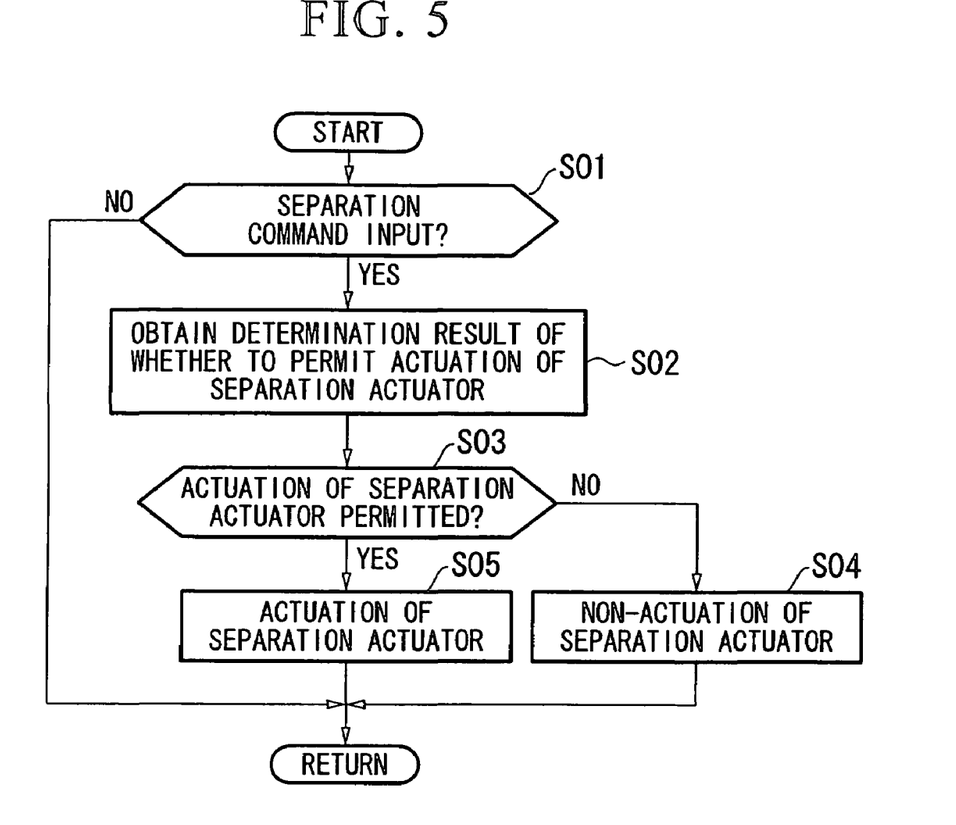
FIG. 5 is a flowchart showing the operation of the on-vehicle component fixation-release apparatus shown in FIG. 1.

First, in step S01 shown for example in FIG. 5, the safety confirmation device 11 determines whether or not a command instructing separation of the fastening member 30 has been input from the external input receiving portion 21 or the input portion 24.

When the determination result is "NO", a series of process terminates.

When the determination result is "YES", the process proceeds to step S02.

In step S02, the determination result of whether or not to permit actuation of the separation actuator 13, that is, permit electrification of the heater 32b is obtained.

Next, step S03 determines whether or not the actuation of the separation actuator 13 is permitted.

When the determination result of step S03 is "NO", the process proceeds to step S04, in which, for example, the switch 12 is set to the OFF state to cut off electrification of the heater 32b, whereby the series of process terminates.

In contrast, when the determination result of step S03 is "YES", the process proceeds to step S05, in which, for example, the switch 12 is set to the ON state to start electrification of the heater 32b, and then the series of process terminates.

Cases of actuation of the separation actuator 13 being permitted include a case of the occupant protection device 22 operating, a case of detection of distortion of the vehicle body exceeding a predetermined value, and a case of the in-cabin temperature rising to a predetermined temperature or higher.

Also, cases of actuation of the separation actuator 13 not being permitted include a case of movement of an occupant from within the cabin to outside the vehicle being impeded by releasing the fixation of an on-vehicle component, and a case of the condition of the occupant in the cabin worsening.

As stated above, according to the on-vehicle component fixation-release apparatus 10 of the present embodiment, by determining whether or not dismantling the fastening member 30 by the safety confirmation device 11, even for example in the case of an input signal that instructs the dismantling of the fastening member 30 being input from the external input receiving portion 21 or the input portion 24, dismantling of the fastening member 30 can be prevented in a state or timing in which releasing the fixation of the on-vehicle component would be unsuitable. Thus, fixation of the on-vehicle component can be suitably released in accordance with the state of the vehicle or the state of the occupants in the cabin.

In addition, the head and the shank 31a of the bolt 31 can be separated by the heat deformation of the inner periphery 32a of the separation actuator 13, and so the fixation of an on-vehicle component can be readily released.

In addition, by providing the dedicated power supply 14 for supplying power for executing dismantling of the fastening member 30 independently of a high-voltage battery that supplies power to the high-voltage electrical equipments of the vehicle and the 12V battery that drives the various auxiliary components, release of the fastening member 30 can be executed even when difficulties arise in supplying power from the high-voltage battery or the 12V battery.

The aforementioned embodiment had the inner circumferential portion of the separation actuator 13 fabricated with a shape memory alloy, and the fragile portion 31b formed in the shank 31b of the bolt 31, but it is not limited thereto. For example, as with a fastening member 40 according to a modification example of the aforementioned embodiment shown in FIG. 6, a head (shape memory member, separation member) 41 and a shank (other member) 42 of a bolt are formed to be detachable. For example, the shank 42 may be formed to be provided with a male portion (convex insertion portion) 42a that projects in the axial direction and a nut mounting portion 42b on which a nut is mounted, with a female portion or through hole (mounting portion) 41a (also referred as a concave or hole-shaped portion, or as a concave engaging portion) having a predetermined interference with respect to the male portion 42a of the shank 42 provided in a head 41 that is formed from a shape memory alloy, so that the male portion 42a may be fixed in the through hole 41a in the state of an interference fit.

Figure 6:
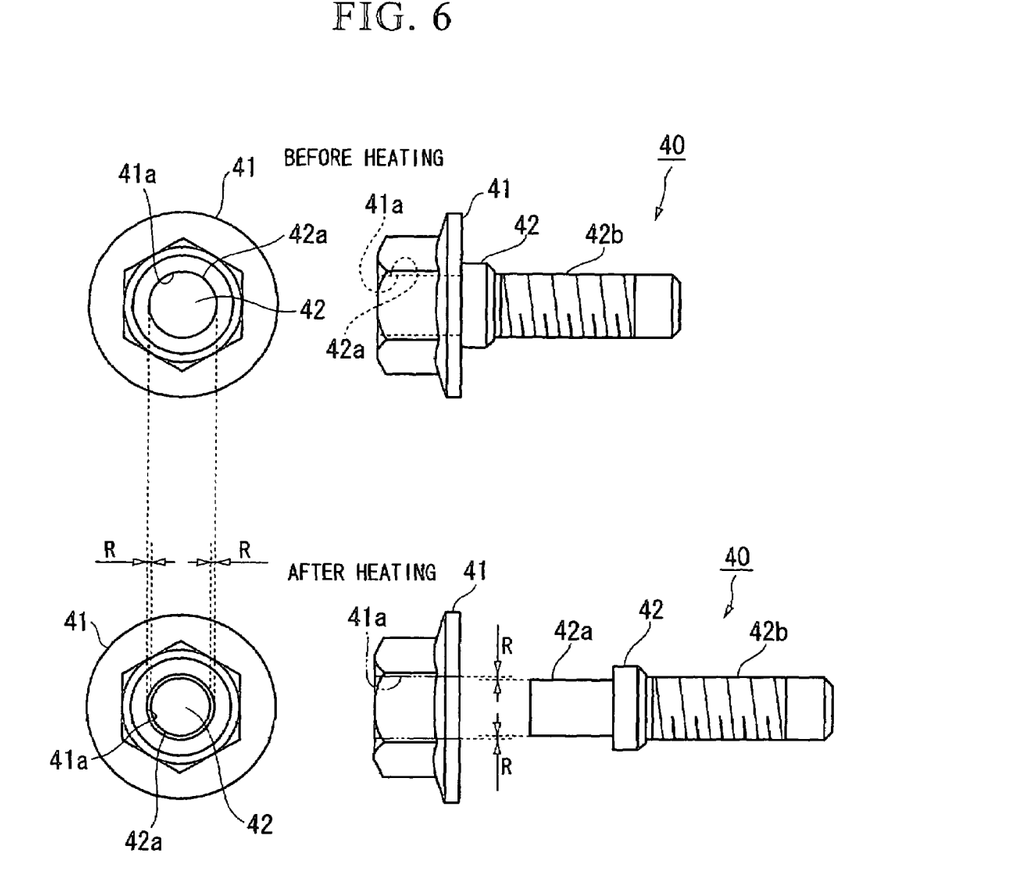
FIG. 6 is a block diagram of a bolt according to a modification example of the present embodiment.

In this fastening member 40, when the head 41 of the bolt is heated in the state of the male portion 42a of the shank 42 inserted in the through hole 41a of the head 41 of the bolt so that the male portion 42a is fixed in the through hole 41a in the state of an interference fit, at the point in time when the temperature of the head 41 rises to the transformation point of the shape memory alloy or more, the inner diameter of the through hole 41a expands by a predetermined length 2R, whereby the head 41 of the bolt and the shank 42 separate.

Figure 7:
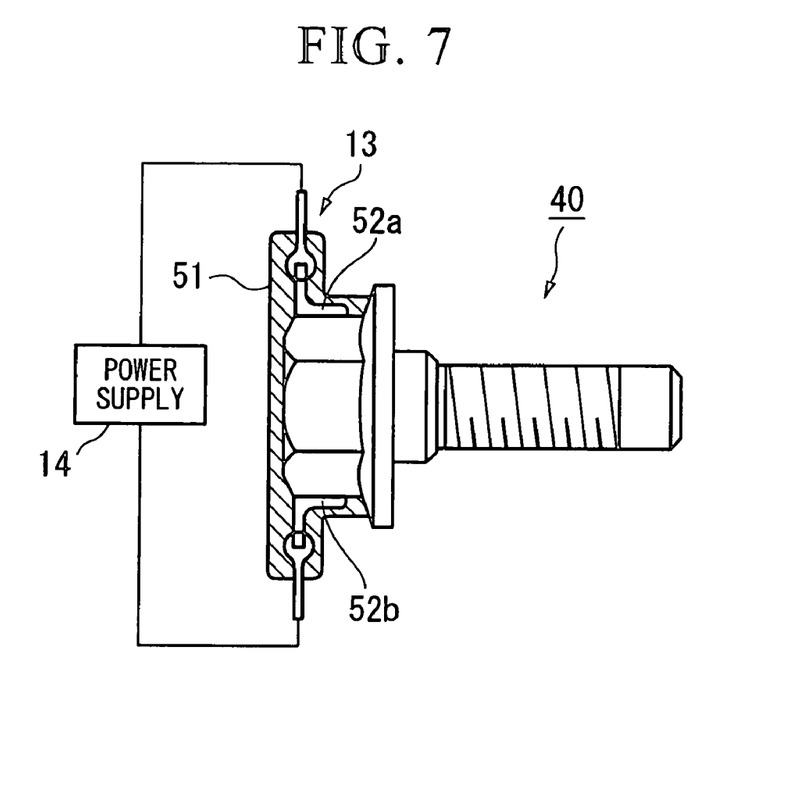
FIG. 7 is a drawing showing the state of a separation actuator according to a modification example of the present embodiment mounted on the bolt.

In this modification example, the separation actuator 13 that heats the head 41 of the bolt is, as shown for example in FIG. 7, includes two electrodes (heating means) 52a and 52b that are connected to the head 41 of the bolt and a cover 51 that is attached so as to cover the head 41 and the electrodes 52a and 52b, with the head 41 made to generate Joule heat by electrification from the power supply 14 via the switch 12.

Figure 8:
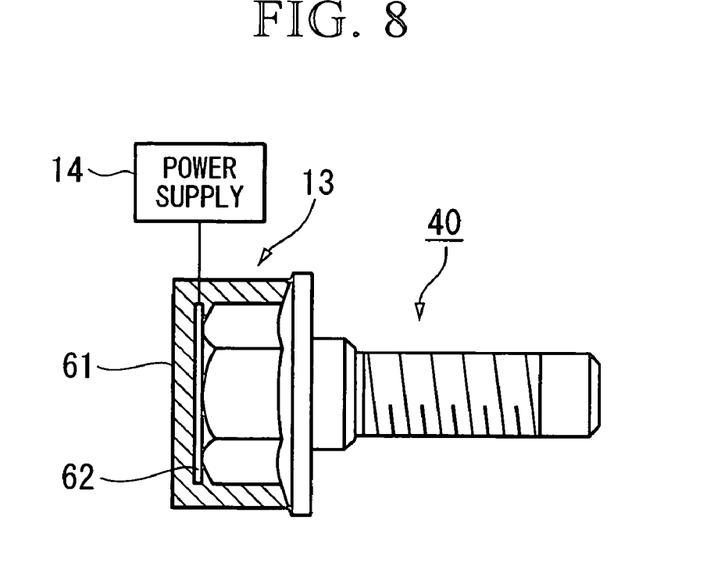
FIG. 8 is a drawing showing the state of a separation actuator according to a modification example of the present embodiment mounted on the bolt.

In this modification example, the separation actuator 13 may be constituted by a heater (heating means) 62 that contacts the head 41 of the bolt and a cover 61 that is attached so as to cover the head 41 and the heater 62, with the head 41 heated by passing electrical current from the power supply 14 to the heater 62 via the switch 12.

Figure 9:
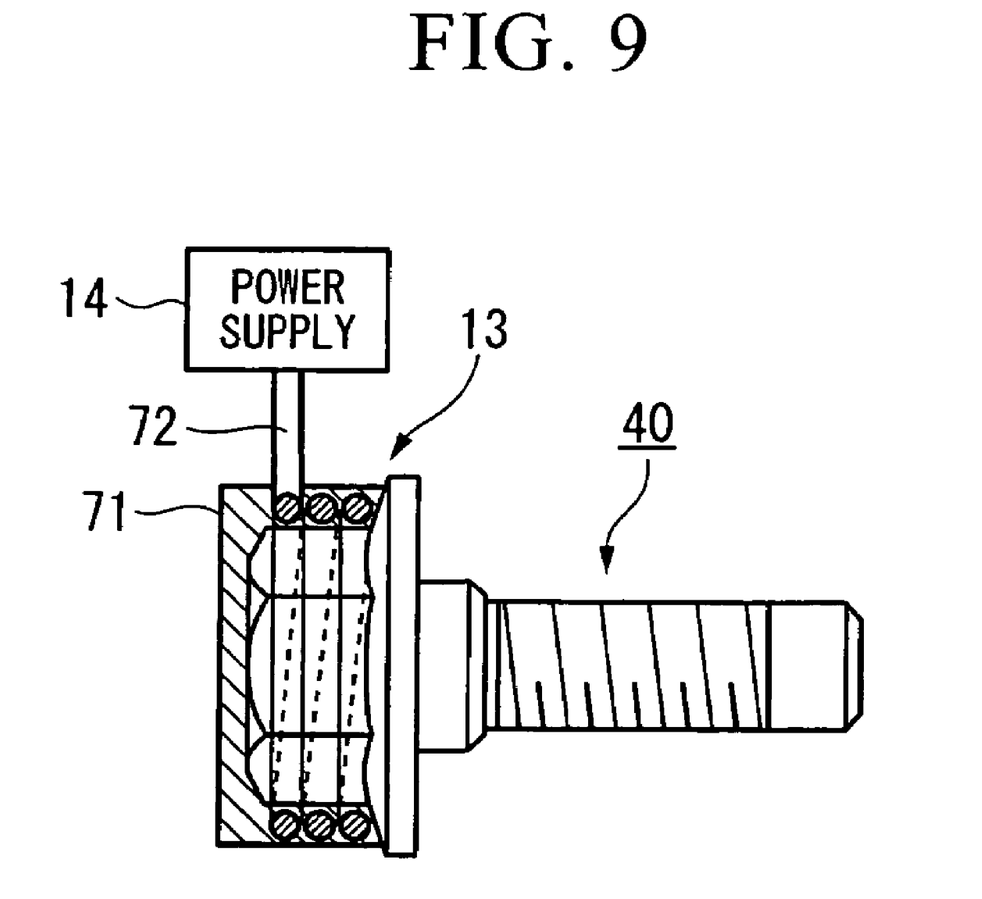
FIG. 9 is a drawing showing the state of a separation actuator according to a modification example of the present embodiment mounted on the bolt.

Also as shown for example in FIG. 9, the separation actuator 13 may be constituted by a coil (heating means) 72 forming an electric heating coil or high-frequency heating coil wound around the head 41 of the bolt and a cover 71 that is attached so as to cover the head 41 and the coil 72, with the head 41 heated by passing electrical current from the power supply 14 to the coil 72 via the switch 12.

In the aforementioned embodiment, the inner circumferential portion 32a of the separation actuator 13 or the head 41 of the bolt were formed by a shape memory alloy, but are not limited thereto. For example, they may be formed by a material with a relatively large thermal expansion coefficient.

Also, in the aforementioned embodiment, the fastening members 30 and 40 are disassembled, but are not limited thereto. For example, a fastening portion at which the fastening member 30 and 40 is fitted may be formed to be able to be dismantled.

Also, in the aforementioned embodiment, separation actuator 13 dismantles the fastening member 30 and 40 by thermal expansion of a material such as a shape memory alloy, but is not limited thereto. For example, the separation actuator 13 may be constituted so as to dismantle the fastening member 30 and 40 by expansion energy that is generated by filling a propellant in advance in the fastening member 30 and 40 and igniting this propellant by electrification from the power supply 14. Also, the separation actuator 13 may be constituted so as to melt the fastening member 30 and 40 by forming a portion or the entirety of the fastening member 30 and 40 with a material that melts by being heated to a predetermined temperature and heating with current from the power supply 14.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention, during deformation of a vehicle body, can readily remove an on-vehicle component from the vehicle body to appropriately reflect the state of the vehicle and its occupants as well as the intention of the operator, and so can accurately prevent the occupant from being trapped inside the cabin.

The invention claimed is:

1. An on-vehicle component fixation-release apparatus that releases fixation of on-vehicle components attached to a vehicle body by a fastening member, said on-vehicle component fixation-release apparatus comprising:

a dismantling means that enables dismantling of the fastening member or a fastening portion at which the fastening member is mounted, and a determination means that determines whether the dismantling by the dismantling means is allowed in accordance with an input signal that is input from outside the vehicle, wherein:

the fastening member or the fastening portion is formed by at least two detachably fixed members that are formed with materials having mutually different expansion coefficients; with a convex insertion portion formed on a member with a relatively small expansion coefficient, and a concave engaging portion that has a predetermined interference with respect to the insertion portion formed on a member with a relatively large expansion coefficient; and the insertion portion fixed to the engagement portion in a state of being inserted therein and interference fitted, and the on-vehicle component fixation-release apparatus further comprising a heating means that, in accordance with a determination result of the determination means, heats the member until fixation between the insertion portion and the engagement portion is released.

2. An on-vehicle component fixation-release apparatus that releases fixation of on-vehicle components attached to a vehicle body by a fastening member, said on-vehicle component fixation-release apparatus comprising:

a dismantling means that enables dismantling of the fastening member or a fastening portion at which the fastening member is mounted, a determination means that determines whether the dismantling by the dismantling means is allowed in accordance with an input signal that is input from outside the vehicle, and an electrical storage means that supplies electrical power required for executing dismantling by the dismantling means, wherein:

the fastening member or the fastening portion is formed by at least two detachably fixed members that are formed with materials having mutually different expansion coefficients; with a convex insertion portion formed on a member with a relatively small expansion coefficient, and a concave engaging portion that has a predetermined interference with respect to the insertion portion formed on a member with a relatively large expansion coefficient; and the insertion portion fixed to the engagement portion in a state of being inserted therein and interference fitted, and the on-vehicle component fixation-release apparatus further comprising a heating means that, in accordance with a determination result of the determination means, heats the member until fixation between the insertion portion and the engagement portion is released.

3. The on-vehicle component fixation-release apparatus according to claim 1 or claim 2, wherein:

the fastening member or the fastening portion is formed by at least two detachably fixed members including a shape memory member that is formed with a shape memory alloy and another member that is formed with a material other than the shape memory alloy, and the on-vehicle component fixation-release apparatus further comprising a heating means that, in accordance with the determination result of the determination means, heats the shape memory member until the temperature of the shape memory member is equal to or greater than a transformation point of the shape memory member.

4. The on-vehicle component fixation-release apparatus according to claim 1 or claim 2, wherein the fastening member or the fastening portion includes a fragile portion, and the dismantling means functions as a separation actuator that separates the fastening member or the fastening portion at the fragile portion in accordance with the determination result of the determination means.

5. The on-vehicle component fixation-release apparatus according to claim 4, wherein the separation actuator comprises:

a separation member that is formed with a shape memory alloy or a material with a larger expansion coefficient than the fragile portion and capable of generating stress that fractures the fragile portion by heat deformation, and a heating means that performs heat deformation by heating the separation member until the fragile portion fractures.

* * * * *